United States Patent
Mueller et al.

(10) Patent No.: US 6,670,418 B2
(45) Date of Patent: Dec. 30, 2003

(54) CROSSLINKABLE ORGANOPOLYSILOXANE COMPOSITIONS

(75) Inventors: Johann Mueller, Burghausen (DE); Adolf Eller, Emmerting (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/335,617

(22) Filed: Jan. 2, 2003

(65) Prior Publication Data

US 2003/0105262 A1 Jun. 5, 2003

Related U.S. Application Data

(63) Continuation of application No. 08/941,495, filed on Sep. 30, 1997, now abandoned.

(30) Foreign Application Priority Data

Nov. 6, 1996 (DE) ......................................... 196 45 721

(51) Int. Cl.⁷ .......................... C08L 83/06; C08L 83/07
(52) U.S. Cl. ..................... 524/862; 524/588; 524/861; 524/493; 525/478; 528/12; 528/31; 528/32
(58) Field of Search ................... 524/493, 588, 524/861, 862; 525/478; 528/12, 31, 32

(56) References Cited

U.S. PATENT DOCUMENTS

| | | |
|---|---|---|
| 4,340,090 A | 7/1982 | Matsushita et al. |
| 5,006,372 A | 4/1991 | Wolfer et al. |
| 5,304,621 A | 4/1994 | Staiger et al. |
| 5,354,830 A | 10/1994 | Williams |
| 5,516,823 A | 5/1996 | Gentle et al. |
| 5,703,190 A | 12/1997 | Dauth et al. |

FOREIGN PATENT DOCUMENTS

| | | |
|---|---|---|
| DE | 3018079 | 11/1980 |
| EP | 0316696 | 5/1989 |
| EP | 0567253 | 10/1993 |
| EP | 0586153 | 9/1994 |

OTHER PUBLICATIONS

Patent Abstracts of Japan, vol. 9, No. 87 (M–372), Apr. 17, 1985 & JP 59 215848 A (Showa Densen Denran), Dec. 5, 1984.

United States Translation of Japanese Patent JP 59 215848 A as supplied by the United States Patent Office.

Primary Examiner—Caixia Lu
(74) Attorney, Agent, or Firm—Brooks Kushman P.C.

(57) ABSTRACT

Crosslinkable organopolysiloxane compositions, comprising;
(1) an organopolysiloxane which contains SiC-bonded radicals with aliphatic carbon—carbon multiple bonds, and
(2) an organopolysiloxane with Si-bonded hydrogen atoms or, instead of (1) and (2), or
(3) an organopolysiloxane which contains SiC-bonded radicals with aliphatic carbon—carbon multiple bonds and Si-bonded hydrogen atoms,
(4) a catalyst which promotes the addition of Si-bonded hydrogen onto an aliphatic multiple bond,
(5) a reinforcing filler
(6) a non-reinforcing filler having an average particle diameter of less than 30 μm and a BET surface area of less than 30 m²/g and, optionally, further substances.

16 Claims, No Drawings

CROSSLINKABLE ORGANOPOLYSILOXANE COMPOSITIONS

This is a continuation of application(s) Ser. No. 08/941,495 filed on Sep. 30, 1997 and now abandoned.

BRIEF SUMMARY OF THE INVENTION

The present invention relates to organopolysiloxane compositions which can be crosslinked by addition of Si-bonded hydrogen onto an aliphatic carbon—carbon multiple bond, their preparation and their use.

BACKGROUND OF THE INVENTION

EP-A-316 696 (Wacker Silicones Co.; published on May 24, 1989) describes organopolysiloxane compositions which can be crosslinked by condensation in which surface-treated aluminum hydroxide is used as an additional component in order to improve the electrical properties of the rubber obtained after crosslinkng. EP-A-586 153 (General Electric Co.; published on Mar. 9, 1994) discloses crosslinkable siloxane compositions which comprise additional fillers, such as calcium silicate, aluminum oxide and ceramic beads, which, in conjunction with alkoxy silanes, improves the mechanical properties, in particular the tear propagation resistance, of silicone rubbers.

DETAILED DESCRIPTION OF THE INVENTION

The invention relates to crosslinkable organopolysiloxane compositions which comprise
(1) an organopolysiloxane which contains SiC-bonded radicals with aliphatic carbon—carbon multiple bonds, and
(2) an organopolysiloxane with a Si-bonded hydrogen atom or, instead of (1) and (2)
(3) an organopolysiloxane which contains a SiC-bonded radical with aliphatic carbon—carbon multiple bonds and Si-bonded hydrogen atoms,
(4) a catalyst which promotes the addition of Si-bonded hydrogen onto an aliphatic multiple bond,
(5) a reinforcing filler
(6) a non-reinforcing filler having an average particle diameter of less than 30 μm and a BET surface area of less than 30 m²/g and, optionally, further substances.

If the composition according to the invention is a two-component silicone rubber composition, the two components of the silicone rubber compositions according to the invention can comprise all the constituents in any desired combination, with the proviso that one component does not simultaneously comprise siloxanes with an aliphatic multiple bond, siloxanes with Si-bonded hydrogen and the catalyst.

In the context of the present invention, the term organopolysiloxanes is also to be understood as meaning polymeric, oligomeric and dimeric siloxanes.

The organopolysiloxane compositions according to the invention have a content of organic solvent of not more than 3% by weight, preferably not more than 2% by weight, the compositions being, in particular, free from organic solvent The siloxanes (1) and (2) or (3) used in the compositions according to the invention are chosen, such that crosslinking is possible. Thus, for example, siloxane (1) contains at least two aliphatically unsaturated radicals and siloxane (2) contains at least three Si-bonded hydrogen atoms, or siloxane (1) contains at least three aliphatically unsaturated radicals and siloxane (2) contains at least two Si-bonded hydrogen atoms, or, instead of siloxane (1) and (2), siloxane (3) which contains aliphatically unsaturated radicals and Si-bonded hydrogen atoms in the above mentioned ratios is used.

Organopolysiloxanes (1) which contain SiC-bonded radicals with aliphatic carbon—carbon multiple bonds are linear or branched organopolysiloxanes comprising units of the formula

in which
R is a monovalent SiC-bonded, optionally substituted hydrocarbon radical which has 1 to 18 carbon atoms and is free from aliphatic carbon—carbon multiple bonds,
$R^1$ is a monovalent SiC-bonded hydrocarbon radical with an aliphatic carbon—carbon multiple bond,
a is 0, 1, 2 or 3 and
b is 0, 1 or 2,
with the proviso that the sum a+b is less than or equal to 3 and at least two radicals $R^1$ are present per molecule.

Examples of radicals R are alkyl radicals, such as the methyl, ethyl, n-propyl, isopropyl, n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical, cycloalkyl radicals, such as cyclopentyl, cyclohexyl, cycloheptyl and methylcyclohexyl radicals, aryl radicals, such as the phenyl, naphthyl, anthryl and phenanthryl radical, alkaryl radicals, such as o-, m- and p-tolyl radicals, xylyl radicals and ethylphenyl radicals, and aralkyl radicals, such as the benzyl radical and the α- and the β-phenylethyl radical.

Examples of substituted radicals R are halogenoalkyl radicals, such as the 3,3,3-trifluoro-n-propyl radical, the 2,2,2,2',2',2'-hexafluoroisopropyl radical and the heptafluoroisopropyl radical, and halogenoaryl radicals, such as the o-, m- and p-chlorophenyl radical.

The radical R is preferably a monovalent SiC-bonded hydrocarbon radical which has 1 to 6 carbon atoms and is free from aliphatic carbon—carbon multiple bonds, the methyl radical being preferred.

Examples of radicals $R^1$ are alkenyl radicals, such as the vinyl, 5-hexenyl, cyclohexenyl, 1-propenyl, allyl, 3-butenyl and 4-pentenyl radical, and alkynyl radicals, such as the ethynyl, propargyl and 1-propynyl radical.

The radical $R^1$ is preferably alkenyl radicals, the vinyl radical being more preferred.

The siloxanes (1) used according to the invention are preferably those of the formula

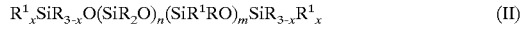

in which
R and $R^1$ have the meaning given above,
x is 0, 1, 2 or 3, preferably 1,
m is 0 or a number from 1 to 50 and
n is a number from 50 to 100,000,
with the proviso that the siloxanes of formula (II) contain at least two radicals $R^1$ per molecule and the n units $(SiR_2O)$ and the m units $(SiR^1RO)$ can be distributed in the molecule as desired, for example as a block or randomly.

The organopolysiloxanes (1) preferably have an average viscosity of 100 to 200,000 mm²/s, more preferably 200 to 100,000 mm²/s, at 25° C.

The compositions according to the invention comprise siloxane (1) in amounts of 10% to 80% by weight, preferably 15% to 60% by weight.

Organopolysiloxanes (2) which contain Si-bonded hydrogen atoms and are used are linear, cyclic or branched organopolysiloxanes of units of the formula

 (III)

in which
R$^2$ has the meaning given above for radical R,
g is 0, 1, 2 or 3 and
f is 0, 1 or 2,
with the proviso that the sum of g+f is less than or equal to 3 and at least 3 Si-bonded hydrogen atoms are present per molecule.

Examples of radical R$^2$ are the examples mentioned for R, alkyl radicals having 1 to 6 carbon atoms being preferred and the methyl and phenyl radicals being more preferred.

In the siloxanes of units of formula (III), the units containing Si-bonded hydrogen can be arranged in a block or distributed randomly.

The organopolysiloxane (2) used according to the invention contains Si-bonded hydrogen in a range from 0.01% to 1.5% by weight, preferably 0.05% to 1.5% by weight, based on the total weight of the organopolysiloxane (2).

The organopolysiloxanes (2) have an average viscosity of 20 to 50,000 mm$^2$/s, preferably 40 to 5000 mm$^2$/s, in each case at 25° C.

The siloxanes (2) used according to the invention are preferably essentially linear siloxanes having a chain length of not more than 1000 siloxane units.

The compositions according to the invention comprise siloxane (2) in amounts of 0.2% to 30% by weight, preferably 0.5% to 20% by weight, in particular 1% to 10% by weight.

The siloxanes (1) and (2) used according to the invention are commercially available products or can be prepared by processes customary in chemistry.

Instead of organopolysiloxanes (1) and (2), the compositions according to the invention can comprise organopolysiloxanes (3) which contain both aliphatic carbon—carbon multiple bonds and Si-bonded hydrogen atoms, although this is not preferred.

If siloxanes (3) are used, they are preferably those of units of the formulae

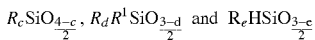

in which
R and R$^1$ have the meaning given above,
c is 0, 1, 2 or 3,
d is 0, 1 or 2 and
e is 0, 1 or 2,
with the proviso that at least 2 radicals R$^1$ and at least 3 Si-bonded hydrogen atoms or at least 3 radicals R$^1$ and at least 2 Si-bonded hydrogen atoms are present per molecule.

Examples of organopolysiloxanes (3) are those of SiO$_{4/2}$, R$_3$SiO$_{1/2}$, R$_2$R$^1$SiO$_{1/2}$ and R$_2$HSiO$_{1/2}$ units, so-called MQ resins, where these resins can additionally contain RSiO$_{3/2}$ and R$_2$SiO units and R and R$^1$ have the above mentioned meaning.

The organopolysiloxanes (3) have an average viscosity of 10 to 100,000 mm$^2$/s at 25° C., or are solids having molecular weights of 5000 to 50,000 g/mole.

Organopolysiloxanes (3) can be prepared by methods customary in chemistry.

The same catalysts which have been used for promoting crosslinking in the compositions to date which can be crosslinked by addition of Si-bonded hydrogen onto an aliphatic carbon—carbon multiple bond can be used as the catalyst (4) which promotes addition of Si-bonded hydrogen onto an aliphatic multiple bond.

Examples of catalysts (4) are metallic and finely divided platinum (platinum sol), ruthenium, rhodium, palladium and iridium, it being possible for these metals to be applied to solid supports, such as silicon dioxide, aluminum oxide, active charcoal, ceramic materials or mixed oxides or mixed hydroxides, although this is not preferred.

Other examples of catalysts (4) are compounds or complexes of these metals, such as platinum halides, for example PtCl$_4$, H$_2$PtDl$_6$.6H$_2$O and Na$_2$PtCl$_4$.4H$_2$O, platinum-olefin complexes, platinum-alcohol complexes, such as, the so-called Speyers catalyst, platinum-alcoholate complexes, platinum-ether complexes, platinum-aldehyde complexes, platinum-ketone complexes, including reaction products of H$_2$PtCl$_6$.6H$_2$O and cyclohexanone, platinum-vinylsiloxane complexes, in particular platinum-1,3-divinyl-1,1,3,3-tetramethyldisiloxane complexes with or without a content of organically bonded halogen, bis-(γ-picoline)-platinum dichloride, trimethylenedipyridine platinum dichloride, dicyclopentadieneplatinum dichloride, dimethyl-sulfoxide ethyleneplatinum (II) dichloride, reaction products of platinum tetrachloride with olefin and primary amine or secondary amine or primary and secondary amine, such as the reaction product of platinum tetrachloride, dissolved in 1-octene, with sec-butylamine, cyclooctadiene-platinum dichloride and norbornadiene-platinum dichloride, as well as ammonium-platinum complexes.

Platinum metals or compounds or complexes thereof, in particular platinum compounds or complexes, are used as catalysts (4) in the compositions according to the invention.

Catalysts (4) are used in amounts such that a platinum content of preferably 0.5 to 500 ppm by weight (=parts by weight per million parts by weight), in particular 3 to 300 ppm by weight, in each case based on the total weight of the composition according to the invention, results.

The reinforcing fillers (5) used according to the invention have a BET surface area of more than 50 m$^2$/g, preferably more than 100 m$^2$/g, more preferably more than 150 m$^2$/g.

Examples of the reinforcing fillers (5) used according to the invention are pyrogenically prepared silicic acid, precipitated silicic acid or silicon-aluminum mixed oxides having a BET surface area of more than 50 m$^2$/g. The fillers mentioned can be hydrophobized, for example by treatment with organosilanes or siloxanes or by etherification of hydroxyl groups to alkoxy groups.

The reinforcing fillers (5) used according to the invention are pyrogenically prepared silicic acids having a BET surface area of more than 100 m$^2$/g, pyrogenically prepared silicic acids having a BET surface area of more than 150 m$^2$/g being preferred.

The compositions according to the invention comprise reinforcing fillers (5) in amounts of 5% to 50% by weight, preferably 5% to 40% by weight, more preferably 5% to 20% by weight.

Examples of the non-reinforcing fillers (6) used according to the invention are powders of quartz, cristobalite, diatomaceous earth, calcium silicate, zirconium silicate, montmorillonites, such as bentonites, zeolites, including the molecular sieves, such as sodium aluminum silicate, metal oxides, such as aluminum oxide or zinc oxide or mixed oxides thereof, metal hydroxides, such as aluminum hydroxide, barium sulfate, calcium carbonate, gypsum, glass or plastics having a BET surface area of less than 30 m²/g and an average particle diameter of less than 30 μm, metal oxides, silicates, metal hydroxides and carbonates being preferred and aluminum oxide, aluminum hydroxide and quartz powder being more preferred.

The average particle diameter of the non-reinforcing fillers (6) used according to the invention is less than 20 μm, preferably 0.1 to 20 μm.

The BET surface area of the non-reinforcing fillers (6) used according to the invention is preferably less than 20 m²/g, more preferably 2 to 20 m²/g.

The compositions according to the invention comprise non-reinforcing fillers (6) in amounts of 10% to 80% by weight, preferably 20% to 70% by weight, in particular 30% to 70% by weight.

The weight ratio of non-reinforcing filler (6) to reinforcing filler (5) in the compositions according to the invention is preferably 20:1 to 2:1, more preferably 12:1 to 4:1.

The non-reinforcing filler (6) and reinforcing filler (5) are commercially available products.

Optionally, the compositions according to the invention can comprise further substances which have been used to date in compositions which can be crosslinked by addition of Si-bonded hydrogen onto an aliphatic multiple bond, such as, inhibitors (7), adhesion promoters (8), siloxanes (9) other than the siloxane (1), (2) or (3), and additives (10).

Examples of inhibitors (7) are siloxanes containing vinyl groups, such as, 1,3-divinyl-1,1,3,3-tetramethyldisiloxane, benzotriazole, dialkylformamides, alkylthioureas, methyl ethyl ketoxime, organic and organosilicon compounds having a boiling point of at least 25° C. under 1012 hPa and at least one aliphatic triple bond, such as 1-ethynylcyclohexan-1-ol, 3-methyl-1-butyn-3-ol, 3-methyl-1-pentyn-3-ol, 2,5-di-methyl-3-hexyne-2,5-diol and 3,5-di ethyl-1-hexyn-3-ol, a mixture of diallyl maleate and vinyl acetate, and maleic acid monoesters.

The inhibitor (7) which is used optionally is preferably an organic alkynol or a siloxane containing vinyl groups, 1-ethynylcyclohexanol, 3-methyl-1-butyn-3-ol and disiloxanes containing vinyl groups being more preferred.

The compositions according to the invention comprise inhibitor (7), in amounts of 0.01% to 3% by weight, preferably 0.05% to 2% by weight, based on the composition according to the invention.

Examples of adhesion promoters (8) which are used, optionally, are silanes with hydrolyzable groups and SiC-bonded vinyl, acryloxy, methacryloxy, epoxide, acid anhydride, acid, ester or ether groups and partial and mixed hydrolyzates thereof, silanes with vinyl groups and silanes with epoxide groups which contain ethoxy or acetoxy groups as hydrolyzable radicals being preferred, and vinyltriethoxysilane, vinyltriacetoxysilane, epoxypropyltriethoxysilane and partial and mixed hydrolyzates thereof being more preferred.

The compositions according to the invention comprise adhesion promoters (8) in amounts of 0% to 5% by weight, preferably 1% to 3% by weight.

Examples of siloxanes (9) which are used, optionally, are organo-polysiloxanes of units of formula (I) or of formula (II) with, fewer than two aliphatically unsaturated radicals per molecule, organopolysiloxanes of units of formula (III) with no or, fewer than three Si-bonded hydrogen atoms per molecule, MT resins of the formula $(R^3_3SiO_{1/2})_y(R^3SiO_{3/2})_z$ and MQ resins of the formula $(R^3_3SiO_{1/2})_y(SiO_{4/2})_z$, in which $R_3$ has a meaning given for the radical R or for $R^1$ and the ratio of y:z can be chosen such that liquid or solid resins are present at room temperature.

The compositions according to the invention comprise siloxane (9) in amounts of 0% to 60% by weight preferably 0% to 40% by weight.

Examples of the additives (10) which are used, optionally, are soluble dyestuffs, inorganic or organic pigments, stabilizers, such as UV stabilizers, agents which trap free radicals and UV blockers, as long as these contain no groups which inhibit the addition of Si-bonded hydrogen onto an aliphatic multiple bond or are not complexing agents for the metals used as catalysts (4).

The nature and amount of the additives (10) which are to be used, optionally, essentially depend on the profile of requirements of the compositions according to the invention or of the vulcanizates formed therefrom and are known to the expert.

The compositions according to the invention comprise no constituents other than components (1) to (10).

Components (1) to (10) used according to the invention can in each case be an individual type of such a component or a mixture of at least two different types of such a component.

The compositions according to the invention have a viscosity of less than 300,000 mm²/s, preferably 50 to 200,000 mm²/s.

The compositions according to the invention are those which comprise
(1) an organopolysiloxane, which contains SiC-bonded radicals with aliphatic carbon—carbon multiple bonds, of units of formula (I), with the proviso that the sum a+b is less than or equal to 3 and at least 2 radicals $R^1$ are present per molecule,
(2) an organopolysiloxane, which contains Si-bonded hydrogen atoms, of units of formula (III), with the proviso that the sum of g+f is less than or equal to 3 and at least 3 Si-bonded hydrogen atoms are present per molecule,
(4) platinum metals or compounds or complexes thereof,
(5) a reinforcing filler having a BET surface area of more than 50 m²/g,
(6) a non-reinforcing filler having an average particle diameter of less than 30 μm and a BET surface area of less than 30 m²/g and
(7) an inhibitor.

The compositions according to the invention are those which comprise
(1) 10% to 80% by weight of organopolysiloxanes, which contain SiC-bonded radicals with aliphatic carbon—carbon multiple bonds, of formula (II), with the proviso that at least two radicals $R^1$ are present per molecule,
(2) 0.5% to 20% by weight of organopolysiloxanes, which contain Si-bonded hydrogen atoms, of units of formula (III), with the proviso that the sum of g+f is less than or equal to 3 and at least 3 Si-bonded hydrogen atoms are present per molecule,
(4) platinum metals or compounds or complexes thereof in amounts such that a platinum content of preferably 0.5 to 500 ppm by weight (=parts by weight per million parts by weight), based on the total weight of the composition according to the invention, results,
(5) 5% to 50% by weight of reinforcing filler having a BET surface area of more than 50 m²/g,
(6) 10% to 80% by weight of non-reinforcing filler having an average particle diameter of less than 30 μm and a BET surface area of less than 30 m²/g and
(7) 0.01% to 3% by weight of inhibitor.

The compositions according to the invention can be prepared by known processes, for example by simple mixing of the individual components.

The compositions according to the invention which can be crosslinked by addition of Si-bonded hydrogen onto an aliphatic multiple bond can be allowed to crosslink under the same conditions as the compositions known to date which can be crosslinked by a hydrosilylation reaction. These are preferably temperatures of 10° to 300° C., more preferably 20° to 280° C., in particular 20° to 200° C., and a pressure of 900 to 1100 hPa. However, higher or lower temperatures and pressures can also be used.

The present invention furthermore relates to shaped articles produced by crosslinking the compositions according to the invention.

The compositions according to the invention can be used in all instances where compositions based on organopolysiloxanes with Si-bonded hydrogen and aliphatically unsaturated radicals have been used to date, for example, as embedding compositions for electrical or electronic devices, as impression compositions or coating compositions or for the production of shaped articles, for example by the injection molding process, vacuum extrusion process, extrusion process, casting molding and compression molding. The compositions according to the invention are always used, in particular, if, on the basis of the profile of requirements, a silicone surface can advantageously be used but the typical blocking surface is to be avoided, such as, for example, surfaces of keyboards, toys, tools, medical articles, insulating hoses and coated textiles.

The most diverse substrates, such as plastics, glass fiber-reinforced plastics, silicone rubber, wood, mineral materials, metal, porcelain, glass, mineral fibers, such as glass fibers or rock wool and textiles, can be coated with the compositions according to the invention. Examples of textile substrates which can be coated with the compositions according to the invention are woven fabrics, knitted fabrics, nonwovens, braided materials and looped fabrics of naturally occurring and/or synthetic fibers, such as cotton, polyamide, polyester, polyethylene, polypropylene, polyurethane, silk and viscose. The textiles coated according to the invention can be used, for example, as electrical insulating covers, electrical insulating hoses, thermal insulations, electrical insulations, sports clothing, sports articles, such as sails, boat covers, rucksacks, tents and protective clothing, awnings, conveyor belts, compensators, foldable containers, inflatable textile containers, blinds or textile architecture.

The composition according to the invention can be applied in the customary manner, for example, by brushing, pouring, spraying, rolling, printing, knife-coating, slop-padding, dipping or screen printing, or by application with a so-called Meyer rod or with an airbrush After application of the composition according to the invention, the coated substrate is preferably exposed to elevated temperature, for example, between 20° and 280° C., for a residence time of 10 to 600 seconds. This can be performed continuously or discontinuously in corresponding heating ovens. The energy can be supplied in the form of hot air, radiation, heat transfer media or by direct contact with hot substrates.

The present invention also relates to a process for the production of coatings which comprises applying the composition according to the invention to the substrate and allowing it to crosslink at a temperature between 20° and 28° C.

The crosslinkable compositions according to the invention have the advantage that, after the crosslinking, they result in vulcanizates with surfaces with a dry hand, which do not have the so-called "froggy hand".

The compositions according to the invention have the advantage that, after the crosslinking, they result in vulcanizates having non-blocking, anti-friction, non-abrasive and matt surfaces.

The compositions according to the invention have the advantage that they are easy to prepare and have excellent processing properties.

The compositions according to the invention have the advantage that they are essentially free from organic solvent.

The compositions according to the invention have the advantage that after the vulcanization, they result in surfaces of reduced coefficient of friction.

The process according to the invention for the production of coatings has the advantage that it is easy to carry out and coatings can be produced in a single working operation.

The process according to the invention for the production of coatings has the advantage that no undesirable solvent vapors form during the crosslinking.

The process according to the invention for the production of coatings also has the advantage that units which are customary in the textile coating industry can be used for processing the compositions according to the invention.

In the examples described below, all the parts data are based on the weight, unless stated otherwise. Unless stated otherwise, the examples below are carried out under a pressure of the surrounding atmosphere, under about 1000 hPa, and at room temperature, at about 20° C., or at a temperature which is established when the reactants are brought together at room temperature without additional heating or cooling.

All the viscosity data below are based on a temperature of 25° C.

The tear propagation resistance of the vulcanizates is determined in accordance with ASTM D624-B-91.

The Shore A hardness is determined in accordance with DIN (Deutsche Industrie Norm [German industrial standard]) 53505-87.

The tear strength is determined in accordance with DIN 53504-85S1.

The elongation at break is determined in accordance with DIN 53504-85S1.

The LOI (limiting oxygen index) is determined in accordance with ASTM D2863-70.

The coefficient of friction is determined in accordance with ASTM D1894.

EXAMPLE 1

15.2 kg of a highly disperse silicic acid with a BET surface area of 300 m$^2$/g (commercially obtainable under the name WACKER HDK® T30 from Wacker-Chemie GmbH, Munich) are distributed homogeneously in a mixture of 34.8 kg of an α,ω-divinyldimethylpolysiloxane with a viscosity of 20,000 mm$^2$/s and 50 kg of an α,ω-divinyldimethylpolysiloxane with a viscosity of 1000 mm$^2$/s. 100 kg of an aluminum oxide powder with an average particle diameter of 1 μm and a BET surface area of 10 m$^2$/g are incorporated homogeneously into the composition thus obtained. 4 kg of a siloxane of the formula $(CH_3)_3SiO[SiO(CH_3)_2]_{3r}[SiO(CH_3)H]_rSi(CH_3)_3$, where r is about 20, and 0.2 kg of ethynylcyclohexanol are then distributed homogeneously in this mixture. 0.2 kg of a solution of a platinum-tetramethyldivinyldisiloxane complex in dimethylpolysiloxane with a platinum content of this solution of 1% by weight is now added.

Glass woven fabric is coated with the composition thus obtained. In this procedure, the composition is knife-coated onto the woven fabric in a layer thickness of 50 μm using a box-type doctor blade and is allowed to crosslink at 150° C. in a circulating air oven for 3 minutes.

The glass woven fabric coated in this way has a matt surface and a dry hand. The coefficient of friction of the coated glass woven fabric is 0.8.

A test specimen is produced with the composition thus obtained by pouring the composition into a mold corresponding to the test specification and heating the closed mold at 150° C. in a circulating air oven for 15 minutes. The test specimen exhibits the following mechanical properties:
Shore A hardness: 64
Tear strength: 5.3 N/mm$^2$
Elongation at break: 140%
Tear propagation resistance: 7.3 N/mm
LOI: 34%

COMPARISON EXAMPLE 1

The procedure described in Example 1 is repeated, with the modification that no aluminum oxide powder is used.

The glass woven fabric coated in this way has a shiny surface and has a froggy-like blocking hand typical of liquid silicone rubbers. The coefficient of friction of the coated glass woven fabric is 1.3.

The test specimen produced exhibits the following mechanical properties:
Shore A hardness: 45
Tear strength: 4.8 N/mm$^2$
Elongation at break: 230%
Tear propagation resistance: 4.3 N/mm
LOI: 24%

COMPARISON EXAMPLE 2

The procedure described in Example 1 is repeated, with the modification that instead of 100 kg of an aluminum oxide powder with an average particle diameter of 1 µm and a BET surface area of 10 m$^2$/g, 100 kg of an aluminum oxide powder with an average particle diameter of 40 µm and a BET surface area of 2 m$^2$/g are used.

The glass woven fabric coated in this way has a matt surface and has a dry hand. The surface shows slightly abrasive properties. The coefficient of friction of the coated glass woven fabric is 0.7.

The test specimen produced exhibits the following mechanical properties:
Shore A hardness: 70
Tear strength: 2.7 N/mm$^2$
Elongation at break: 50%
Tear propagation resistance: 8.4 N/mm
LOI: 35%

EXAMPLE 2

The procedure described in Example 1 is repeated, with the modification that instead of 100 kg of an aluminum oxide powder with an average particle diameter of 1 µm and a BET surface area of 10 m$^2$/g, 100 kg of a quartz flour with an average particle diameter of 2 µm and a BET surface area of 4 m$^2$/g are used.

The glass woven fabric coated in this way has a matt surface and a dry hand. The coefficient of friction of the coated glass woven fabric is 0.8.

The test specimen produced exhibits the following mechanical properties:
Shore A hardness: 83
Tear strength: 4.8 N/mm$^2$
Elongation at break: 70%
Tear propagation resistance: 9.7 N/mm
LOI: 31%

COMPARISON EXAMPLE 3

The procedure described in Example 1 is repeated, with the modification that instead of 100 kg of an aluminum oxide powder with an average particle diameter of 1 µm and a BET surface area of 10 m$^2$/g, 100 kg of a quartz flour with an average particle diameter of 50 µm and a BET surface area of 2 m$^2$/g are used.

The glass woven fabric coated in this way has a matt surface and a dry hand. The surface shows abrasive properties. The coefficient of friction of the coated glass woven fabric is 0.9.

The test specimen produced exhibits the following mechanical properties:
Shore A hardness: 81
Tear strength: 5.2 N/mm$^2$
Elongation at break: 50%
Tear propagation resistance: 2.5 N/mm
LOI: 30%

EXAMPLE 3

The procedure described in Example 1 is repeated, with the modification that instead of 100 kg of an aluminum oxide powder with an average particle diameter of 1 µm and a BET surface area of 10 m$^2$/g, 100 kg of a sodium aluminum silicate with an average particle diameter of 4 µm and a BET surface area of 15 m$^2$/g, with the chemical composition Na[AlSi$_3$O$_8$] are used.

The glass woven fabric coated in this way has a matt surface and a dry hand. The coefficient of friction of the coated glass woven fabric is 0.9.

The test specimen produced exhibits the following mechanical properties:
Shore A hardness: 78
Tear strength: 3.3 N/mm$^2$
Elongation at break: 73%
Tear propagation resistance: 8.6 N/mm
LOI: 29%

EXAMPLE 4

The procedure described in Example 1 is repeated, with the modification that instead of 100 kg of an aluminum oxide powder with an average particle diameter of 1 µm and a BET surface area of 10 m$^2$/g, 100 kg of the component mentioned in Table 1 (Example 4a quartz flour, 4b–d aluminum oxide, 4e–f chalk) are used.

The results in respect of the nature of the surface and the mechanical properties are to be found in Table 1.

TABLE 1

| Example | Filler 6 | Particle size [µm] | BET surface area [m$^2$/g] | Viscosity [mm$^2$/s] | Influence on the mechanical properties and surface |
|---|---|---|---|---|---|
| 4a | SiO$_2$ | 8 | 15 | 140,000 | slightly shiny, sliding |
| 4b | Al$_2$O$_3$ | 5 | 10 | 132,000 | meets the requirements |

TABLE 1-continued

| Example | Filler 6 | Particle size [μm] | BET surface area [m²/g] | Viscosity [mm²/s] | Influence on the mechanical properties and surface |
|---|---|---|---|---|---|
| 4c | Al$_2$O$_3$ | 2 | 5 | 123,000 | slightly shiny, sliding, meets the requirements |
| 4d | Al$_2$O$_3$ | 10 | 5 | 123,000 | slightly shiny, sliding, somewhat weak mechanically |
| 4e | CaCO$_3$ | 10 | 15 | 145,000 | surface slightly shining, scarcely blocking |
| 4f | CaCO$_3$ | 5 | 12 | 128,000 | surface slightly shiny, weak blocking properties |

COMPARISON EXAMPLE 4

The procedure described in Example 1 is repeated, with the modification that instead of 100 kg of an aluminum oxide powder with an average particle diameter of 1 μm and a BET surface area of 10 m²/g, 100 kg of the 15 component mentioned in Table 2 (Example V4a–b quartz flour, V4c–d aluminum oxide, V4e calcined kieselguhr, V4f barium sulfate and V4g talc) are used.

The results in respect of the nature of the surface and the mechanical properties are to be found in Table 2.

TABLE 2

| Example | Filler 6 | Particle size [μm] | BET surface area [m²/g] | Viscosity [mm²/s] | Influence on the mechanical properties and surface |
|---|---|---|---|---|---|
| V4a | SiO$_2$ | 3 | 55 | 280,000 (too high) | shiny, blocking |
| V4b | SiO$_2$ | 1 | 60 | 336,000 (too high) | shiny, blocking |
| V4c | Al$_2$O$_3$ | 1 | 50 | 175,000 | surface shiny, blocking |
| V4d | Al$_2$O$_3$ | 60 | 5 | 118,000 | severely abrasive |
| V4e | Si$_4$O$_8$ · H$_2$O | n.a. | 70 | 320,000 (too high) | surface shiny, somewhat blocking |
| V4f | BaSO$_4$ | 30 | 3 | 116,000 | shiny, somewhat blocking slightly abrasive |
| V4g | Mg$_3$[(OH)$_2$ Si$_4$O$_{10}$] | 0.5 | 80 | 420,000 (too high) | shiny, non-blocking poor mechanical properties |

What is claimed is:

1. A crosslinkable organopolysiloxane composition which cures to a non-blocking polyorganosiloxane, comprising:
   (1) an organopolysiloxane having SiC-bonded radicals with aliphatic carbon—carbon multiple bonds, and
   (2) an organopolysiloxane with Si-bonded hydrogen atoms or,
   (3) an organopolysiloxane having both SiC-bonded radicals with aliphatic carbon—carbon multiple bonds and Si-bonded hydrogen atoms;
   (4) a catalyst which promotes the addition of Si-bonded hydrogen onto an aliphatic multiple bond,
   (5) from 5–50 weight percent of a reinforcing filler having a BET surface area of more than 50 m²/g, and
   (6) from 10–80 weight percent of a non-reinforcing filler having an average particle diameter of less than 30 μm and a BET surface area of less than 20 m²/g,
   wherein the weight ratio of non-reinforcing filler to reinforcing filler is from 12:1 to 4:1, all weight percents based on the total weight of the crosslinkable organopolysiloxane composition.

2. An organopolysiloxane composition as claimed in claim 1, wherein the organopolysiloxanes (1) are linear or branched organopolysiloxanes of units of the formula

in which

R is a monovalent SiC-bonded, optionally substituted hydrocarbon radical which has 1 to 18 carbon atoms and is free from aliphatic carbon—carbon multiple bonds, R$^1$ is a monovalent SiC-bonded hydrocarbon radical with an aliphatic carbon—carbon multiple bond, a is 0, 1, 2 or 3 and b is 0, 1 or 2, with the proviso that the sum a+b less than or equal to 3 and at least two radicals R$^1$ are present per molecule.

3. An organopolysilocane composition as claimed in claim 1, wherein the organopolysiloxanes (2) are linear, cyclic or branched organopolysiloxanes of units of the formula

 (III)

in which

R$^2$ has the meaning given above for the radical R, g is 0, 1, 2 or 3 and f is 0, 1 or 2, with the proviso that the sum of g+f is less than or equal to 3 and at least 3 Si-bonded hydrogen atoms are present per molecule.

4. An organopolysiloxane composition as claimed in claim 1, wherein the average particle diameter of the non-reinforcing filler (6) is less than 20 µm.

5. An organopolysiloxane composition as claimed in claim 1, wherein the BET surface area of the non-reinforcing filler (6) is less than 20 m²/g.

6. An organopolysiloxane composition as claimed in claim 1, comprising:

(1) 10% to 80% by weight of organopolysiloxanes of the formula

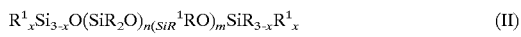

$$R^1_x Si_{3-x}O(SiR_2O)_{n(SiR^1RO)_m}SiR_{3-x}R^1_x \quad (II)$$

in which R and R¹ have the meaning given above for these radicals, x is 0, 1, 2 or 3, m is 0 or a number from 1 to 50 and n is a number from 50 to 100,000, with the proviso that the siloxanes of formula (II) contain at least two radicals R¹ per molecule and the n units (SiR₂O) and the m units (SiR¹RO) can be distributed in any manner in the molecule, and (2) 0.5% to 20% by weight of organopolysiloxanes of units of formula (III) with the proviso that the sum of g+f is less than or equal to 3 and at least 3 Si-bonded hydrogen atoms are present in the molecule.

7. The composition of claim 1, wherein said organopolysiloxane having SiC-bonded radicals with aliphatic carbon—carbon multiple bonds (1) has a viscosity of from about 20,000 mm²/s to about 100,000 m² at 25° C.

8. The composition of claim 1, wherein said non-reinforcing filler has a mean particle size of from 0.1 µm to about 20 µm.

9. The composition of claim 1, wherein said reinforcing filler has a BET surface area greater than 150 m²/g.

10. A process for preparing a coated substrate coated with a non-blocking organopolysiloxane, said process comprising coating a substrate with the crosslinkable organopolysiloxane coating composition of claim 1, and curing said coating composition.

11. A process for preparing a coated substrate coated with a non-blocking organopolysiloxane, said process comprising coating a substrate with the crosslinkable organopolysiloxane coating composition of claim 2, and curing said coating composition.

12. A process for preparing a coated substrate coated with a non-blocking organopolysiloxane, said process comprising coating a substrate with the crosslinkable organopolysiloxane coating composition of claim 7, and curing said coating composition.

13. A process for preparing a coated substrate coated with a non-blocking organopolysiloxane, said process comprising coating a substrate with the crosslinkable organopolysiloxane coating composition of claim 8, and curing said coating composition.

14. The process of claim 10, wherein said substrate comprises a woven or non-woven fabric.

15. A coated substrate, prepared by the process of claim 10.

16. The coated substrate of claim 15, wherein said coated substrate is an article selected from the group consisting of electrical insulating covers, electrical insulating hoses, thermal insulation, electrical insulation, sports clothing, sports articles, sails, boat covers, rucksacks, tents, protective clothing, awnings, conveyor belts, compensators, foldable containers, inflatable textile containers, blinds, and textile architectural materials.

* * * * *

UNITED STATES PATENT AND TRADEMARK OFFICE
CERTIFICATE OF CORRECTION

PATENT NO. : 6,670,418 B2
DATED : December 30, 2003
INVENTOR(S) : Johann Mueller et al.

It is certified that error appears in the above-identified patent and that said Letters Patent is hereby corrected as shown below:

<u>Column 13,</u>
Line 16, delete "$(_{SiR}{}^1RO)$" and insert therefor -- $(SiR^1RO)$ --.
Line 35, delete "$100,000m^{2}$" and insert therefor -- $(100,000mm^2)$ --

Signed and Sealed this

First Day of June, 2004

JON W. DUDAS
*Acting Director of the United States Patent and Trademark Office*